May 6, 1952 H. T. LAMBERT ET AL 2,595,859
DOUBLE DISK HYDRAULIC BRAKE CONSTRUCTION
Filed Dec. 21, 1948 6 Sheets-Sheet 1

INVENTORS
H. T. Lambert
C. R. Myers
BY: Robb & Robb
ATTORNEYS

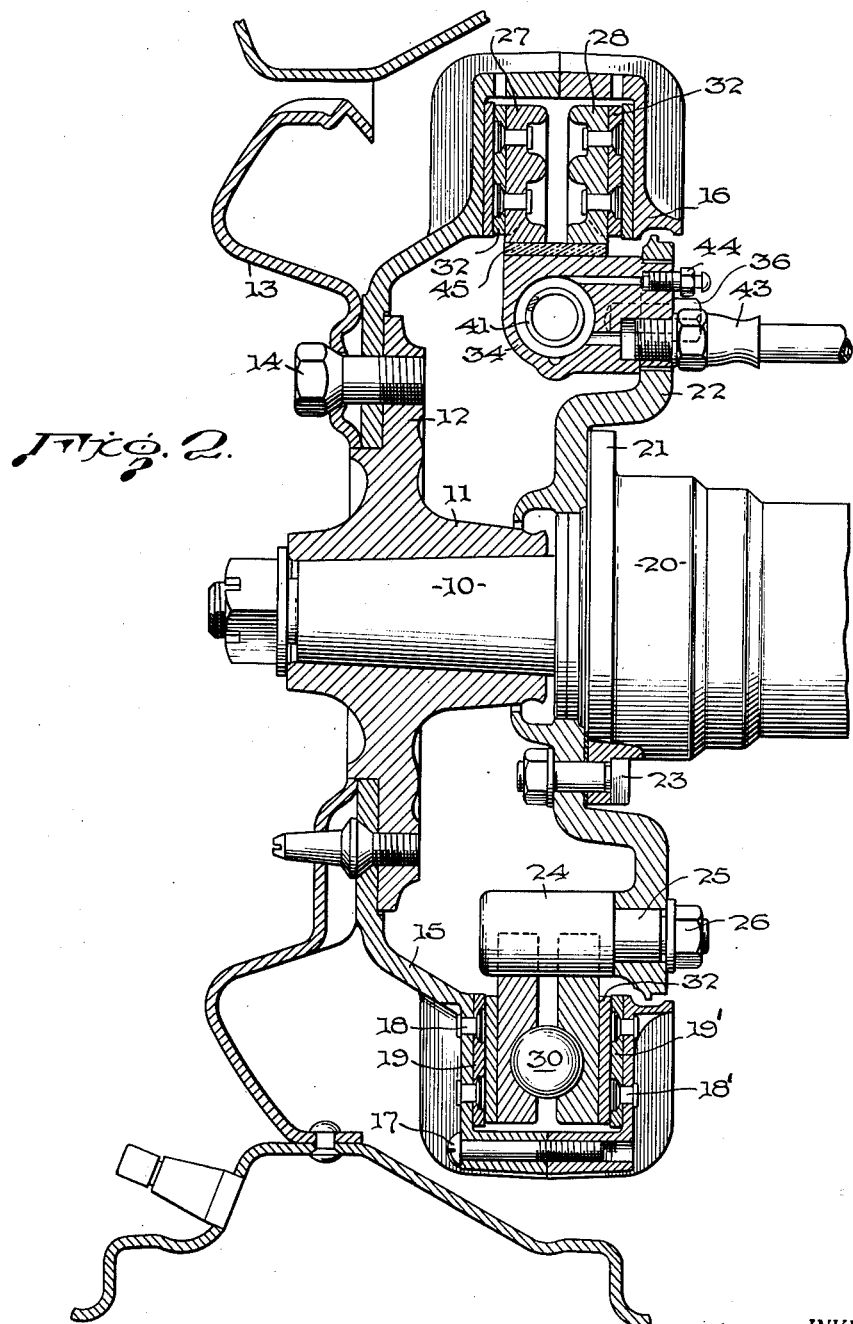

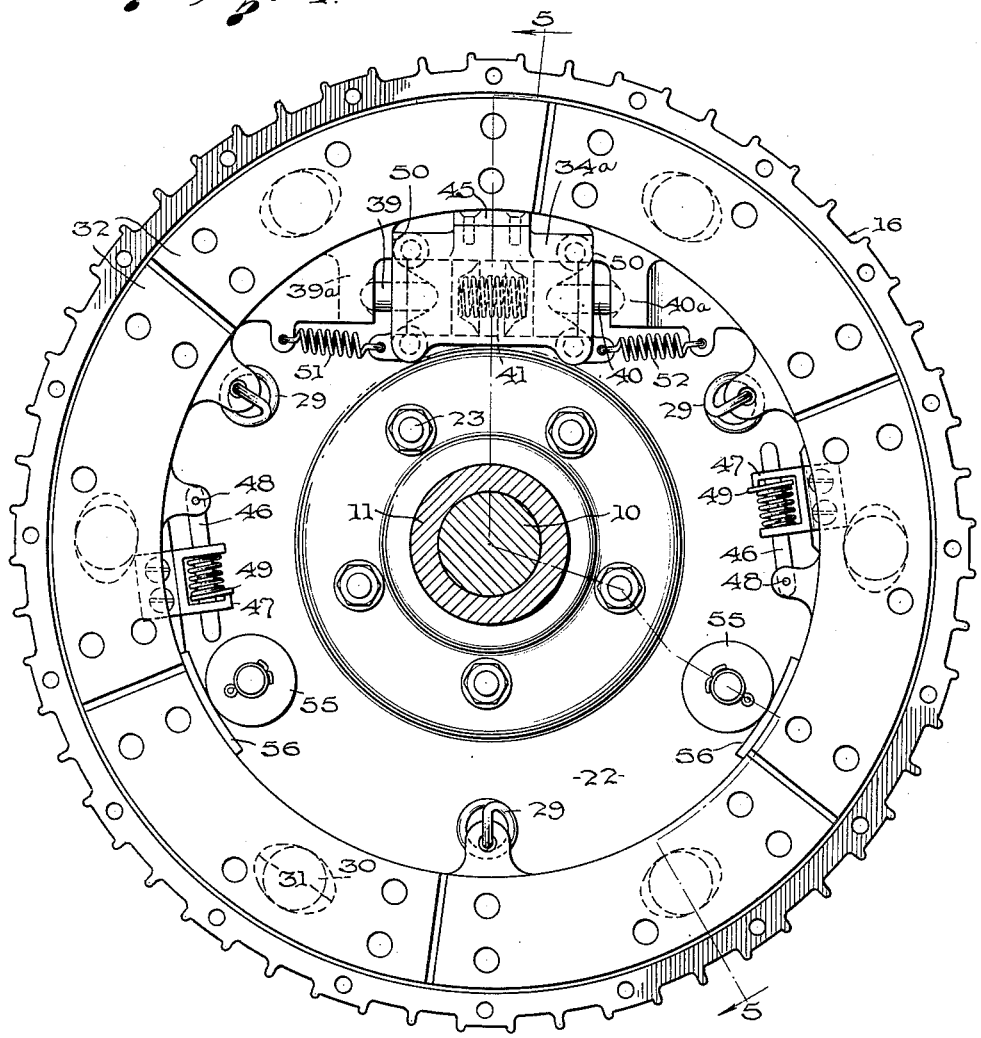

May 6, 1952 H. T. LAMBERT ET AL 2,595,859
DOUBLE DISK HYDRAULIC BRAKE CONSTRUCTION
Filed Dec. 21, 1948 6 Sheets-Sheet 4
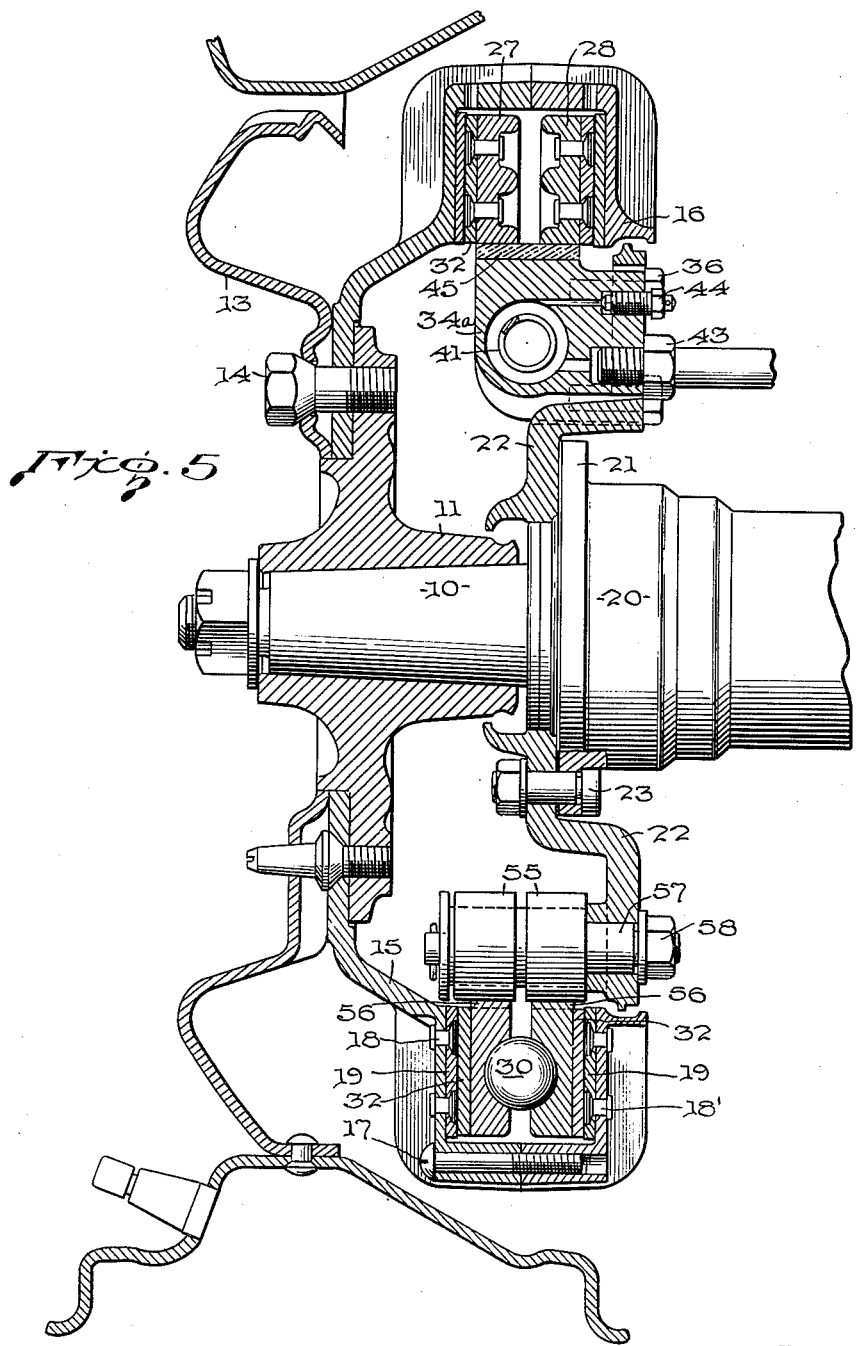

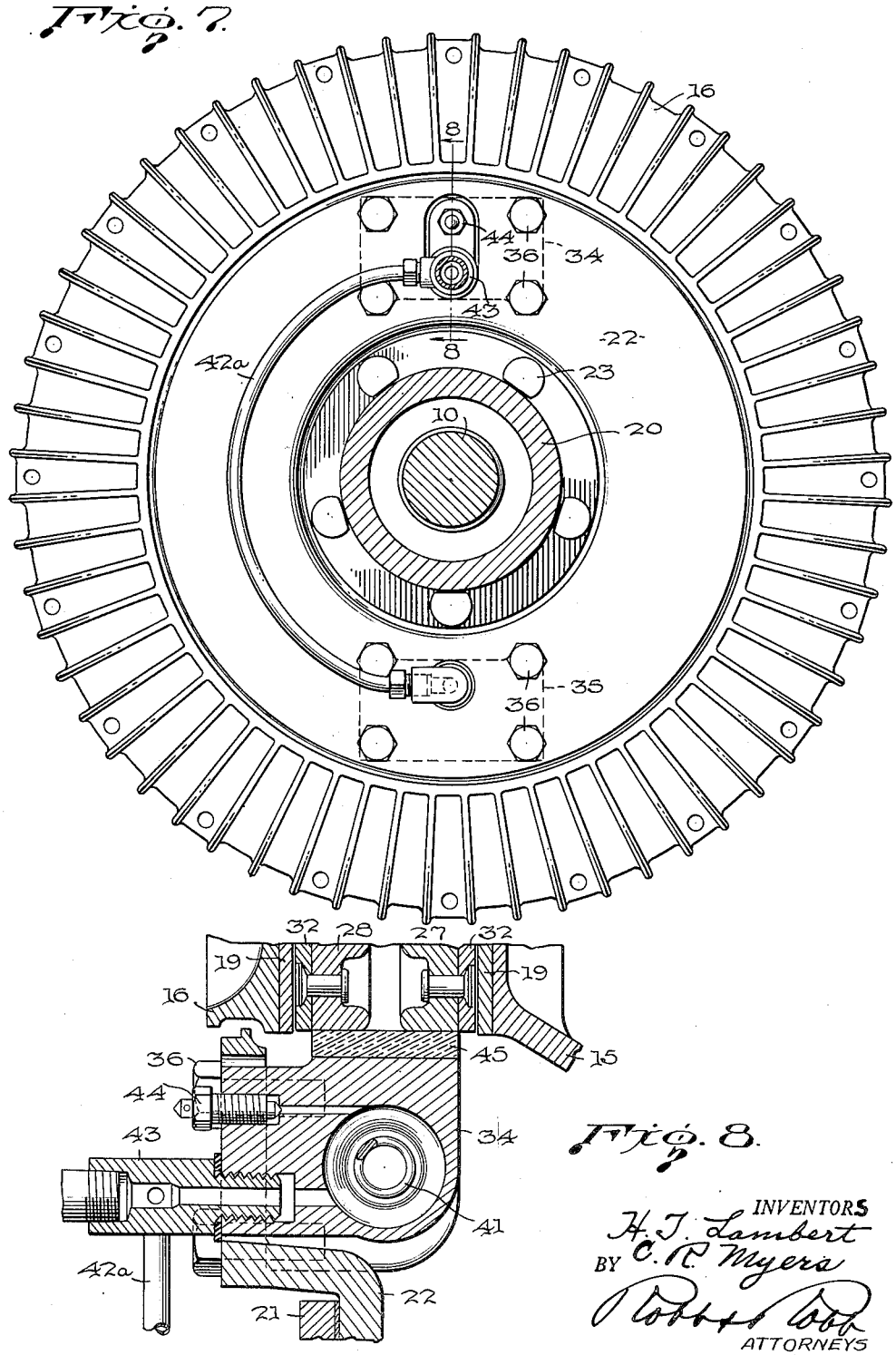

Patented May 6, 1952

2,595,859

UNITED STATES PATENT OFFICE 2,595,859

DOUBLE DISK HYDRAULIC BRAKE CONSTRUCTION

Homer T. Lambert, St. Joseph, and Claude R. Myers, Galien, Mich., assignors, by direct and mesne assignments, to Lambert Brake Corporation, St. Joseph, Mich., a corporation of Michigan Application December 21, 1948, Serial No. 66,404

5 Claims. (Cl. 188—72)

1

The present invention relates to improvements in that type of double-disk hydraulic or fluid-operated brakes, disclosed in our co-pending application, filed April 13, 1948, Serial No. 20,648, now Patent 2,555,651, June 5, 1951, and further exemplified in the application of Dasse and Myers, filed October 18, 1948, Serial No. 55,178, now Patent 2,526,149, April 13, 1948.

The advantages of these double-disk brake constructions hereinafter more fully explained, over the drum type of brake, are now well established by us, speaking specifically, in respect to the distribution and dissipation of the great heat generated quickly incident to braking actions of powerful brakes of these types employed by automobiles, airplanes, heavy trucks, trailer and semi-trailer trucks, and other vehicles, particularly when operated at high speeds, but the manner of applying effective braking forces to the braking units themselves has presented a problem of considerable difficulty.

These double-disk brakes have solved many of the problems, such as elimination of disintegration of the brake linings, "loss of pedal" due to drum expansion, the vaporization of brake fluid, poor deceleration, warpage of brake drums, and others which have caused many fatal accidents.

One of the main objects of the present improvements is the production of a brake which will produce more braking power with about half the pedal pressure required in drum brakes, thus lessening the dangerous driver-fatigue on long drives which has caused many accidents.

Another objective of great importance, even in respect to the prior constructions of this type of brake disclosed in the prior applications hereinbefore referred to, is to provide a more effective or rigid mounting for the hydraulic cylinders which previously have been carried by the "floating" brake actuator unit assembly, enabling these cylinders to be disposed more nearly coplanar with the braking disks of said assembly to thereby transmit their forces in direct planes of rotation of the disks.

So effective is this arrangement that we are able to accomplish a further objective, i. e., the reduction of the number of power cylinders while maintaining concentricity of the actuator unit assembly and uniformity of the slight rotary and axial movements of the braking disks thereof, especially suitable for heavy as well as light trucks or vehicles.

Other and further objects and advantages of the invention will be hereinafter set forth and

2 the novel features thereof defined by the appended claims.

In the drawings:

Figure 2 is a sectional view taken about on the plane indicated by the line 2—2 of Figure 1;

Figure 4 is a view similar to that of Figure 1, of a modified form of construction utilizing only a single power cylinder unit with opposed roller mountings for the brake unit assembly;

Figure 5 is a sectional view taken about on the line 5—5 of Figure 4;

Figure 7 is an external elevational view of a brake construction as in Figures 1 and 6, modified only to the extent of the disposition of the power fluid tube between the cylinders outside of the casing to prevent any likelihood of vaporization of the hydraulic fluid;

Figure 8 is a sectional view on the line 8—8 of Figure 7, enlarged to show the details of construction of the upper cylinder.

Figure 1:
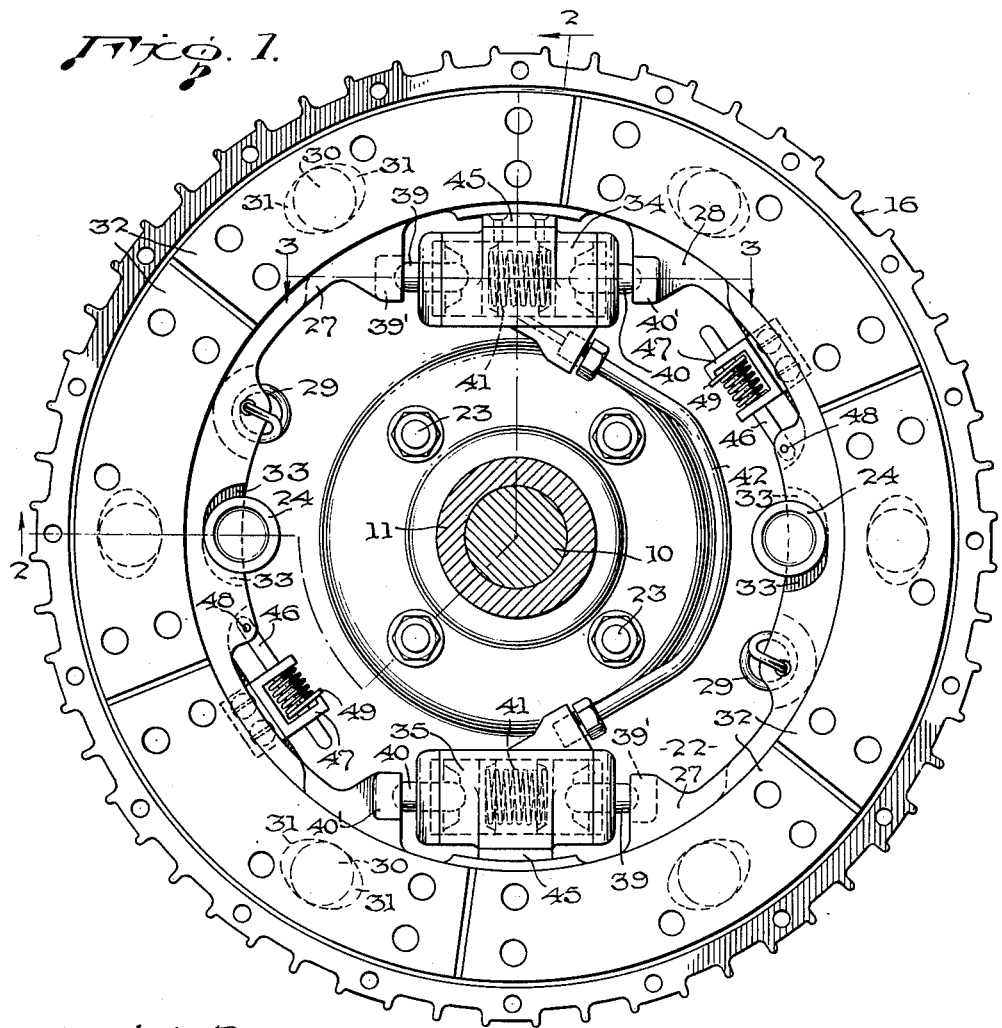
Figure 1 is a view in elevation of a brake constructed in accordance with the preferred form of this invention, with opposed sets of double power cylinders, one side of the rotatable casing being removed and the mounting driving shaft being shown in section.

Referring to the drawings and specifically describing that form of the invention shown in Figures 1 to 3, 10 designates a rear drive shaft of a motor vehicle with attached hub 11 having the wheel flange 12 to which the wheel 13 is connected by means of the usual bolts 14. Also attached to the hub is the driving disk 15 shaped to form one-half of the brake casing, including the complemental cover plate 16, which parts are connected together by the screws 17. Inside of the disk 15 are secured by rivets 18 the annular wear segments 19 forming one braking surface and the inner disk or cover plate 16 is likewise provided with similar segments 19' secured by rivets 18' forming the opposite braking surface.

To the rear axle housing 20 and flange plate 21, we connect an adapter plate 22, as by means of the bolts 23, and it is this plate that forms the support for the hollow studs 24, press fitted therein at 25, and held by nuts 26.

Upon these studs is mounted the braking unit assembly, an independent unit composed of the two complemental braking disks 27—28, connected together by the transversely arranged tensioned springs 29 but held spaced from each other by the energizing balls 30, disposed in oppositely tapering seats 31, which, when one disk is rotated slightly relative to the other, cause the disks to shift axially apart until their brake linings 32—32 come into frictional contact with the contiguous friction surfaces of the revolving casing 15—16 to produce braking action.

The inner peripheries of the discs 27—28 are notched, as at 33, 33, to form seats for the studs 24 and in one direction of relative rotation of these disks one of the same is held against the stud while the other disk is free to rotate slightly and a reversal of this arrested rotation takes place with a reversal of the relative movement of the disks from that just stated.

Figure 3:
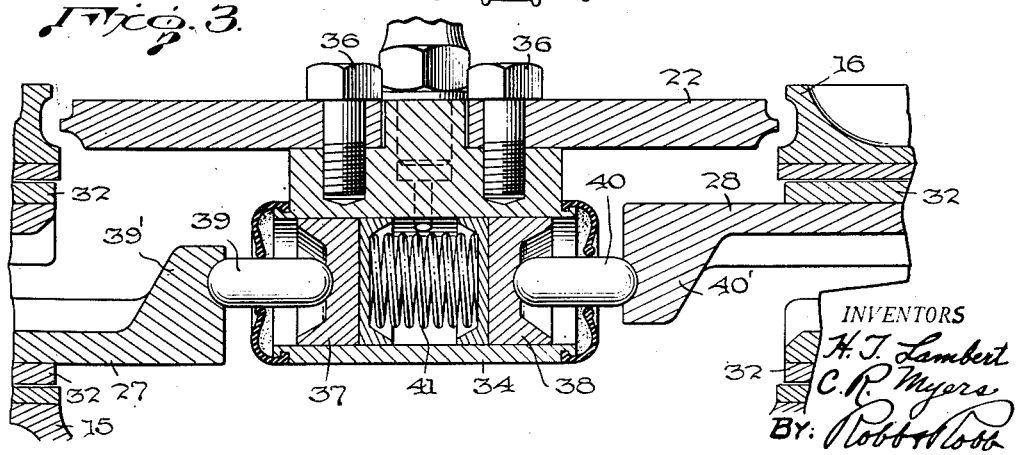
Figure 3 is an enlarged horizontal sectional view on the line 3—3 of Figure 1, showing the details of one of the double power cylinders and its mounting.

The principle of the braking action of this construction is disclosed in both of the applications first above referred to, but the important distinction in the construction lies in the mounting of the power cylinders for imparting the relative rotary movements to the disks 27—28. Heretofore these cylinders have been mounted on one side of one of the disks of the braking unit assembly and thus they partook of its floating movements, but in the present construction we mount both the upper cylinder 34 and the lower cylinder 35 rigidly on the adapter plate 22, by the bolts 36, as best shown in Figure 3 of the drawing. This disposes the cylinders more in the same plane as the disks.

Moreover, each of these cylinders is what we term a double cylinder because of the fact that two opposed pistons 37—38 are mounted in each while the piston plunger 39 is seated against the lug 39' of the outer disk 27 and the opposite plunger 40 is seated against the lug 40' of the inner disk 28.

Between the two pistons of each cylinder is mounted an expansion spring 41 which holds the plungers 39—40 in contact with the respective pistons and the lugs 39'—40' in the absence of fluid pressure in the spring chamber between the pistons.

The lower cylinder 35 is constructed and arranged similarly to the upper and a tube 42 establishes communication between the two cylinders which are supplied with pressure fluid in the conventional manner through the hose nipple 43 of the upper cylinder, which latter is also provided with the bleeder plug 44.

A strip of insulation 45 is disposed between each cylinder and the actuating disks so as to prevent transfer of heat from the latter to the fluid in the cylinders which would otherwise tend to vaporize the fluid when not so protected.

Incidentally, we employ in this construction an automatic adjuster for taking up any substantial wear between the friction surfaces of the brake occurring during use of these brakes, this being generally composed of the adjuster rod 46 connected to one actuator disk and passing through the bracket 47 connected to the other disk and loosely pivoted at the end, as at 48. A spring tensioned locking washer or clutch disk 49 engaging the rod 46 normally prevents movement of the rod in one direction while permitting it to shift in the other direction when wear between the friction surfaces of the casing and the disks takes place, thus maintaining constant the running clearance between these friction surfaces at all times. No claim is made herein to this important feature, since this is the subject matter of the Dasse and Myers application hereinbefore referred to.

Figure 6:
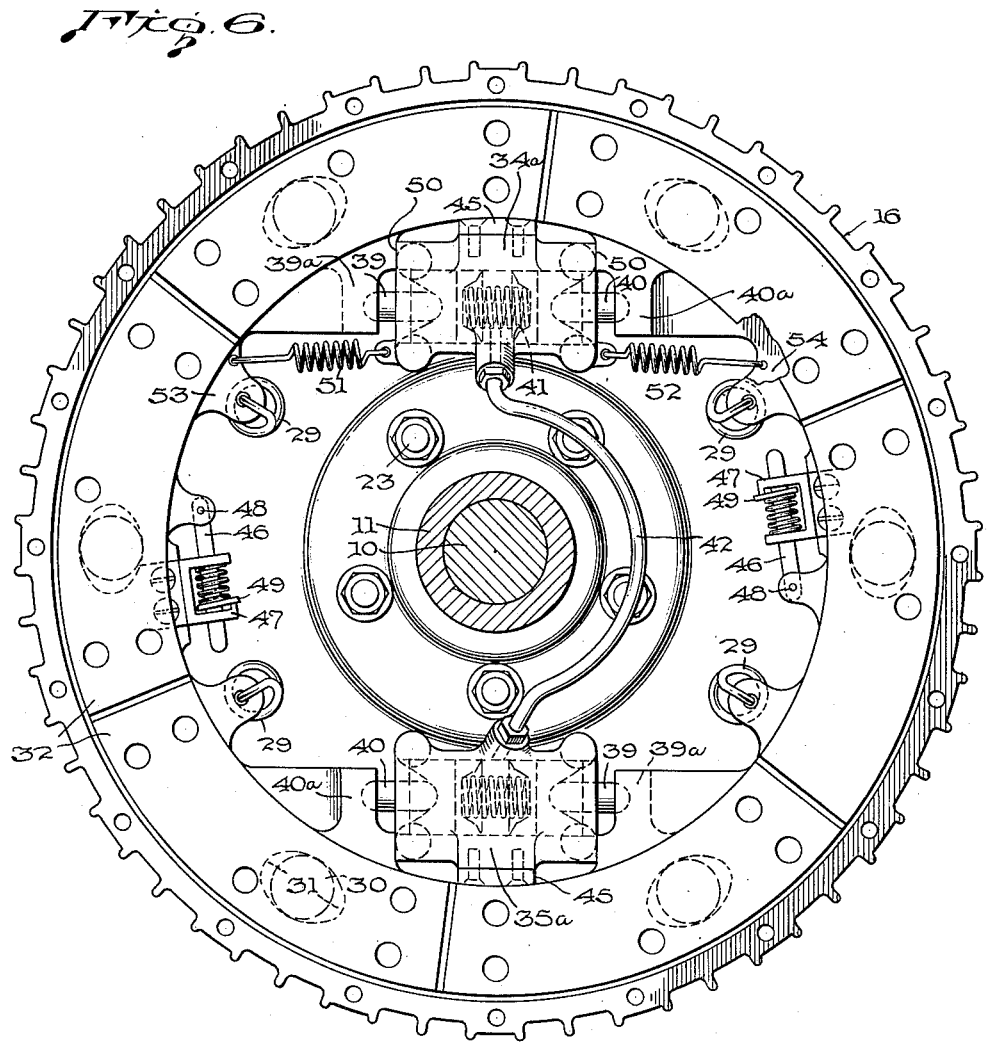
Figure 6 is a view in elevation, with one side of the casing removed, of another modified form of the arrangement in Figure 1, and in which the actuator disks abut against the ends of the power cylinders which thus act as stops for said disks.

Coming now to the form of brake construction shown in Figure 6, this differs little from that shown in Figure 1, being distinguished therefrom mainly by the use of the power cylinders as stops for the normal positioning of the actuator disks and the further elimination of the mounting studs 24 of the preferred form shown in Figure 1. That is to say, the lug 39a is formed with a flat seat at 50 to seat against the flat end face of the cylinder 34a. The lug 40a is likewise formed. Furthermore, in this form the disks are tensioned in the normal brake-released position by two additional springs 51, 52, the former being connected to the cylinder casting at one end and to the lug 53 of the outer disk, and the latter being also connected at one end to the opposite end of the cylinder 34a and at its other end to the lug 54 on the inner disk. Otherwise, the parts of this brake construction correspond to the preferred form of Figure 1, and, therefore, need not be further referred to other than, as stated above, the studs are omitted due to the self-centering support which is provided by the pistons and the tension springs 29, 51 and 52.

In Figures 4 and 5 we illustrate another modification of the brake construction as generally shown in Figure 6, and it bears such close similarity as to have the same reference characters for the parts illustrated with the exception of those now to be referred to. In this construction, it will be observed that only one cylinder, namely, the upper one, is employed, and its ends constitute the stops for the actuator disks as hereinbefore described with reference to the form shown in Figure 6. Instead of using the lower cylinder, we have provided two sets of roller supports, each comprising a pair of side-by-side rollers 55 having a bearing on the cooperating surfaces 56 formed on the inner periphery of the respective actuator disks. These rollers 55 are carried by the stud 57 secured to the adapter plate 22 by means of the nut 58. It will be noted that the raised surfaces or tracks 56 for these rollers prevent any possible contact of the rollers with the braking surfaces carried by the disks, and by disposing the sets of rollers at the points shown clearly in Figure 4, having regard to the position of the cylinder 34a, the actuator disks or braking unit assembly will be held in its concentric relation at all times during the use of this brake construction. This form of brake is particularly suited for lighter trucks and trailers and possesses sufficient power, due to the double piston arrangement of the single cylinder, to provide effective braking action at all speeds, and such construction is much cheaper to manufacture in view of the elimination of the second cylinder casting and its parts.

The foregoing leaves only the description of the construction employed in connection with the illustrations of Figures 7 and 8. The only change in this form with respect to what has been described in Figures 1 and 6 resides in the positioning of the communicating fluid pressure conduit 42a outside of the revolving casing composed of the disc 15 and its cover plate 16 as set forth clearly in relation to the construction of Figures 1 and 2. This insures against the transfer of heat to the pressure fluid since it is disposed in position to be cooled by the air during the movement of the vehicle, such as at the time of brake application. However, in view of the quick dissipation of heat by the fin construction of the rotating casing and the use of double disks of the braking unit assembly, the mounting of this tube within the casing, as shown in Figures 1 and 6 of the drawings, is entirely permissible, so that the two mountings of the communicating tube are optional under all conditions of use of this form of brake apparatus.

The operation of the various brake constructions as disclosed herein will be obvious from the foregoing and is generally similar to that described in the co-pending applications hereinbefore referred to. Briefly summarizing the operation, it will be understood that the pressure fluid is admitted to the power cylinder or cylinders in any suitable manner, as by the conventional application of a brake pedal (not shown) or other control member. When so admitted, the pressure within the power cylinder or cylinders causes the opposed pistons to move outwardly away from each other in each cylinder, thereby producing a thrust upon the plungers 39—40, which thrust is transmitted to the disks 27—28, causing relative rotation of the latter. This relative rotation of the disks produces an axial separation of the disks by means of the balls 30 disposed between the disks and seated in the inclined camming seats 31 in the respective disks. The axial separation of the disks causes the same to engage the opposed braking surfaces on the inner faces of the rotatable casing 15—16, such initial engagement causing a slight further rotation of one of the disks 27—28 relative to the other to increase the braking effect in the nature of a servo or self-energizing action. The braking action is equally effective in either direction of rotation of the casing 15—16, which is particularly advantageous in the case of automotive or vehicle brakes. When the pressure fluid is released, the disks 27—28 will automatically return to their initial positions, under the influence of the tension springs 29 and/or 51—52, with the balls 30 located at or near the bottom of the inclined recesses 31, preparatory to subsequent brake applications.

By reason of the fact that the power cylinder or cylinders is or are stationary at all times, the plungers 39—40 are so constructed and arranged as to permit of a slight rocking movement thereof against the pistons and against the lugs with which the plungers engage at their outermost ends in directing the thrusts on the disks 27—28, thus allowing relative rotation of the disks incident to brake application, as well as relative axial displacement of the disks which takes place during braking engagement of the disks with the braking surfaces of the casing 15—16, and disengagement thereof.

While the specific details of construction have been herein shown and described, the invention is not confined thereto as changes and alterations may be made without departing from the spirit thereof as defined by the appended claims.

We claim:

1. In brake mechanism for vehicles or the like, a rotary member to be braked, a braking unit within the rotary member comprising a pair of complemental relatively rotatable disks frictionally engageable with and disengageable from the rotary member aforesaid, energizing means between the disks for effecting separation of the latter for brake application upon relative rotary movement of one disk with respect to the other, means on which said disks are slidably mounted for axial movement, said means constituting stop means for limiting rotary movement of one disk relative to the other, opposed hydraulic cylinders, each having opposed pistons, one piston coacting with one of the disks for imparting slight rotary movement to the disk free to rotate and the other piston coacting with the other disk for holding the latter against the stop means, and means establishing hydraulic pressure communication between the cylinders.

2. Brake mechanism for vehicles or the like, comprising a rotary casing having spaced internal friction surfaces, a braking unit composed of a pair of disks each having a plunger seat arranged in opposed relation to the other, a hydraulic cylinder between said plunger seats having opposed pistons and plungers seated on said seats, means for admitting pressure fluid into the cylinder between the pistons, yieldable means for holding the disks in brake-released position, means between the disks for separating the same and bringing them into contact with the casing friction surfaces, a supporting flange on which said cylinder is fixedly mounted, and means spaced equidistant from the cylinder and mounted on said flange for holding the braking unit in the casing to properly cooperate with the friction surfaces of the latter.

3. Brake means as set forth in claim 2, wherein the spaced means comprise rollers having contact with the inner periphery of the disks for support of the same.

4. Brake means as set forth in claim 2, wherein the brake disks are provided with shoulders to contact with the ends of the cylinder for limiting rotative movement of the disks in one direction while permitting free rotary movement in the other direction.

5. Brake means as set forth in claim 2, combined with springs, each connected at one end to a disk and at its other end to the cylinder, tending to hold the disks stopped during brake-release.

HOMER T. LAMBERT.
CLAUDE R. MYERS.

REFERENCES CITED

The following references are of record in the file of this patent:

UNITED STATES PATENTS

| Number | Name | Date |
|---|---|---|
| 2,278,144 | Milan | Mar. 31, 1942 |
| 2,344,690 | Freer | Mar. 21, 1944 |
| 2,346,480 | Freer | Apr. 11, 1944 |
| 2,387,039 | Parrett | Oct. 16, 1945 |
| 2,526,149 | Myers et al. | Oct. 17, 1950 |
| 2,555,651 | Lambert et al. | June 5, 1951 |